United States Patent [19]
Hara et al.

[11] Patent Number: 5,684,349
[45] Date of Patent: Nov. 4, 1997

[54] ELECTROMAGNETIC ROTARY ACTUATOR

[75] Inventors: Yasuhiko Hara; Fumihiko Tsuji, both of Tokyo; Katsuhito Miyoshi, Aichi, all of Japan

[73] Assignees: Kayaba Kogyo Kabushiki Kaisha, Tokyo; Toukai Denshi Kogyo Kabushiki Kaisha, Aichi, both of Japan

[21] Appl. No.: 498,544

[22] Filed: Jul. 5, 1995

[30] Foreign Application Priority Data

Jul. 8, 1994 [JP] Japan .................. 6-157588

[51] Int. Cl.⁶ .................. H02K 7/10; H02K 33/00
[52] U.S. Cl. .................. 310/77; 310/36
[58] Field of Search .................. 310/77, 254, 76, 310/92, 93, 36

[56] References Cited

U.S. PATENT DOCUMENTS

| | | | |
|---|---|---|---|
| 3,665,231 | 5/1972 | Wendler | 310/77 |
| 3,760,909 | 9/1973 | Grove | 188/138 |
| 4,142,610 | 3/1979 | Alexander et al. | 188/71.9 |
| 4,280,072 | 7/1981 | Gotou et al. | 310/67 R |
| 4,442,392 | 4/1984 | Hore | 318/696 |
| 4,628,752 | 12/1986 | Paxton et al. | 74/411.5 |
| 4,647,801 | 3/1987 | Swartwout | 310/41 |
| 4,890,027 | 12/1989 | Bohner et al. | 310/328 |
| 5,034,670 | 7/1991 | Tominaga | 318/436 |
| 5,189,354 | 2/1993 | Tominaga et al. | 318/671 |
| 5,389,862 | 2/1995 | Tominaga | 318/254 |
| 5,413,566 | 5/1995 | Sevrain et al. | 604/248 |

FOREIGN PATENT DOCUMENTS 2280653  11/1990  Japan .

Primary Examiner—Steven L. Stephan
Assistant Examiner—Michael Wallace, Jr.
Attorney, Agent, or Firm—Jordan and Hamburg

[57] ABSTRACT

A ring rotor is supported free to rotate in a housing, and a plurality of magnets are provided on the inner circumference of the ring rotor having their N and S poles oriented alternately. A stator is fixed to the housing on the inner side of the ring rotor, this stator having a plurality of coils. A switch is provided in the energizing path of the coils, and a mechanism for stopping the ring rotor at a predetermined rotation position is also provided. When one of the coils is energized via the switch, the ring rotor is caused to rotate, and is then held by the stop mechanism. Since the coils are not energized after the operation, power is economized, and burning of the coils is prevented.

4 Claims, 7 Drawing Sheets

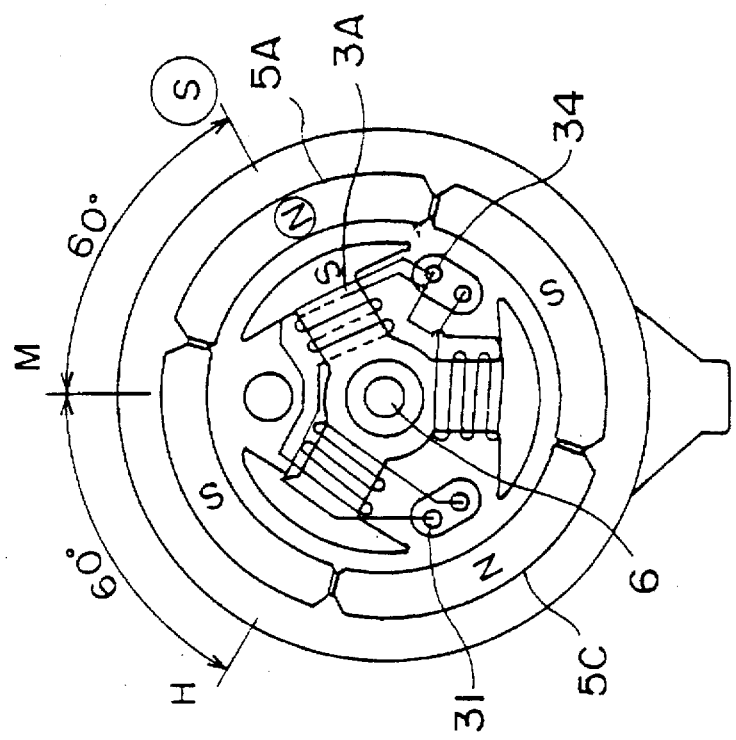
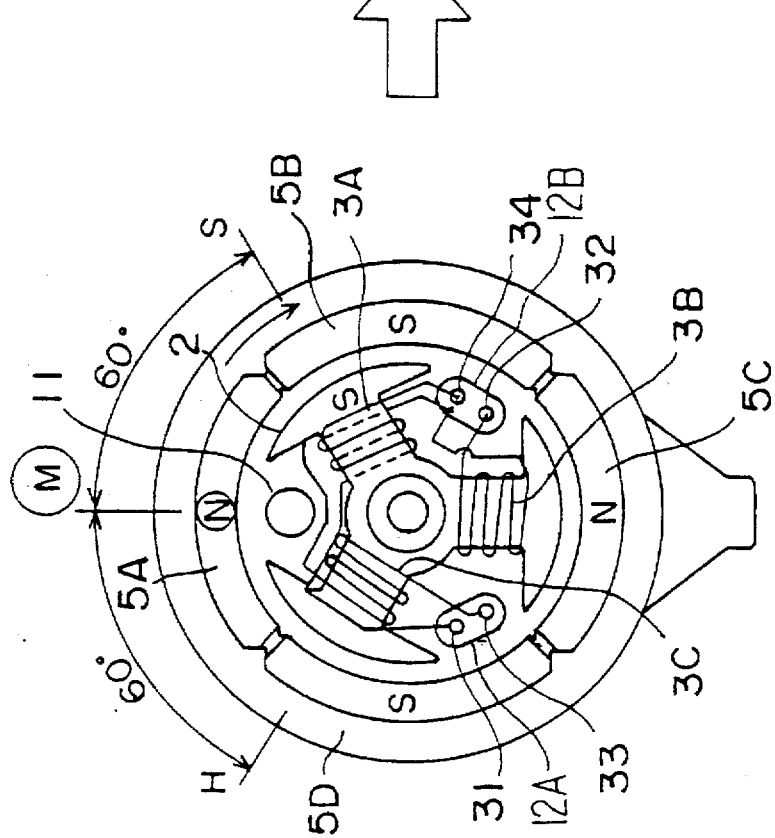
FIG. 5 (B)
FIG. 5 (A)

1

ELECTROMAGNETIC ROTARY ACTUATOR

BACKGROUND OF THE INVENTION

This invention relates to an electromagnetic rotary actuator that performs a rotating action according to a current supplied to a coil.

A number of electronically controlled automobile suspension systems exist comprising a hydraulic damper that selects a damping force according to an input signal. This selection is achieved by installing a plurality of orifices having different flowpath cross-sections in parallel in the damper oil flowpath and a control rod, inserted in the damper, for selecting the desired orifice by varying its rotation angle. The control rod is connected to a rotary type electromagnetic actuator and rotates between a plurality of rotation angles in response to a signal from a controller.

An example of this type of electromagnetic actuator is disclosed for example in Tokkai Hei 2-280653 published by the Japanese Patent Office in 1990. This electromagnetic actuator comprises rotors formed from magnets that rotate and fixed stators energized via coils so that there is no need to supply current from sliding contacts. The rotors comprise four permanent magnets with alternating N and S poles, and the stators comprise six coils surrounding the rotors at equidistant intervals.

When the six coils are energized simultaneously, the rotors are caused to rotate between three rotation positions spaced 60 degrees apart according to an energizing pattern. This energizing pattern is selected by a change-over mechanism comprising three switches each having three contacts.

In this actuator, the coils are formed on the stator side, and as there is no need to supply current to rotating parts, making the use of sliding contacts unnecessary. This makes the actuator more durable.

However, this actuator comprises a plurality of coils and has a complex operating mechanism, hence the cost of manufacturing is high and it is difficult to make the operating mechanism compact. Further, as predetermined rotation positions of the rotors are maintained by magnetic force, the rotors may not retain their positions and may move independently when the current is interrupted.

SUMMARY OF THE INVENTION

It is therefore an object of this invention to simplify the construction of an electronic rotary actuator and position change-over mechanism.

It is a further object of this invention to keep a rotor in its stop position even after current has been interrupted.

It is still a further object of this invention to increase the drive torque of the rotor.

In order to achieve the above objects, the present invention provides an electromagnetic rotary actuator that rotates when energized. The actuator comprises a ring rotor supported free to rotate on a base, a plurality of magnets arranged on the inner circumference of the ring rotor having their N and S poles oriented alternately, a stator fixed to the base on the inner side of the ring rotor, a plurality of coils wound on the stator, a switch mechanism provided in an energizing path of the coils, and a mechanism for keeping the ring rotor in a predetermined rotation position.

The keeping mechanism preferably comprises an engaging hole formed at a predetermined position of the ring rotor, a position determining member that engages with and disengages from the engaging hole, and a mechanism for pushing the position determining member towards the engaging hole.

The number of coils is preferably set to be one less than the number of magnets. In this case, the switch mechanism preferably comprises a mechanism for selectively supplying energizing current to one of the coils.

The actuator preferably further comprises a timer installed in series with the switch mechanism for interrupting a current supply to the energizing path when the supply has continued for a given time.

The details as well as other features and advantages of this invention are set forth in the remainder of the specification and are shown in the accompanying drawings.

BRIEF DESCRIPTION OF THE DRAWINGS

FIG. 5 is a horizontal sectional view of the electromagnetic actuator showing the relative positional displacement of a ring rotor and a stator.

DESCRIPTION OF THE PREFERRED EMBODIMENTS

Figure 1:
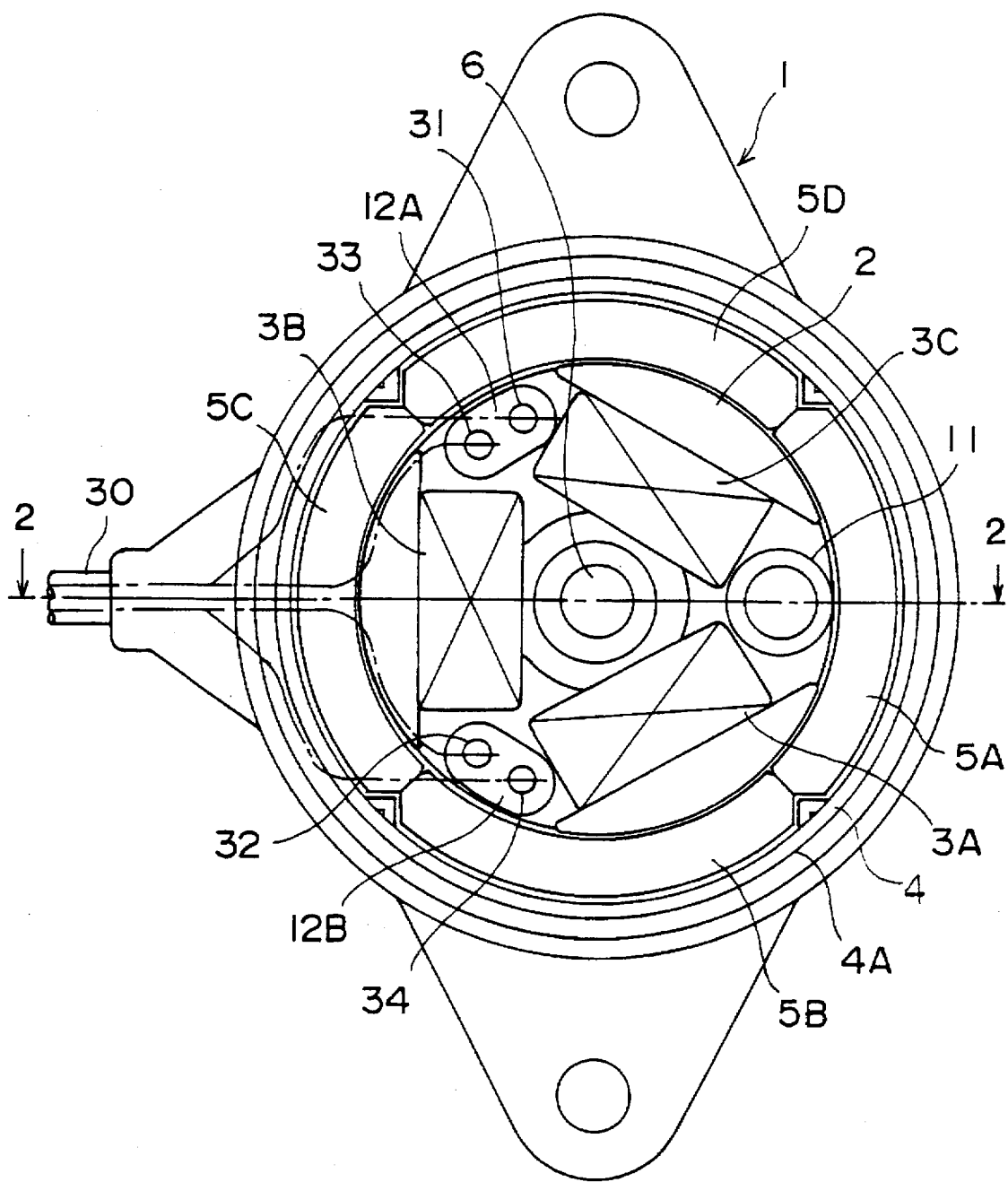
FIG. 1 is a horizontal sectional view of an electromagnetic actuator according to this invention.

Referring to FIG. 1 of the drawings, a cylindrical ring rotor 4 with a base is housed in a circular recess of a housing 1 of an electromagnetic actuator. The housing 1 is fixed to the upper edge of a damping force change-over type hydraulic damper, not shown.

Figure 2:
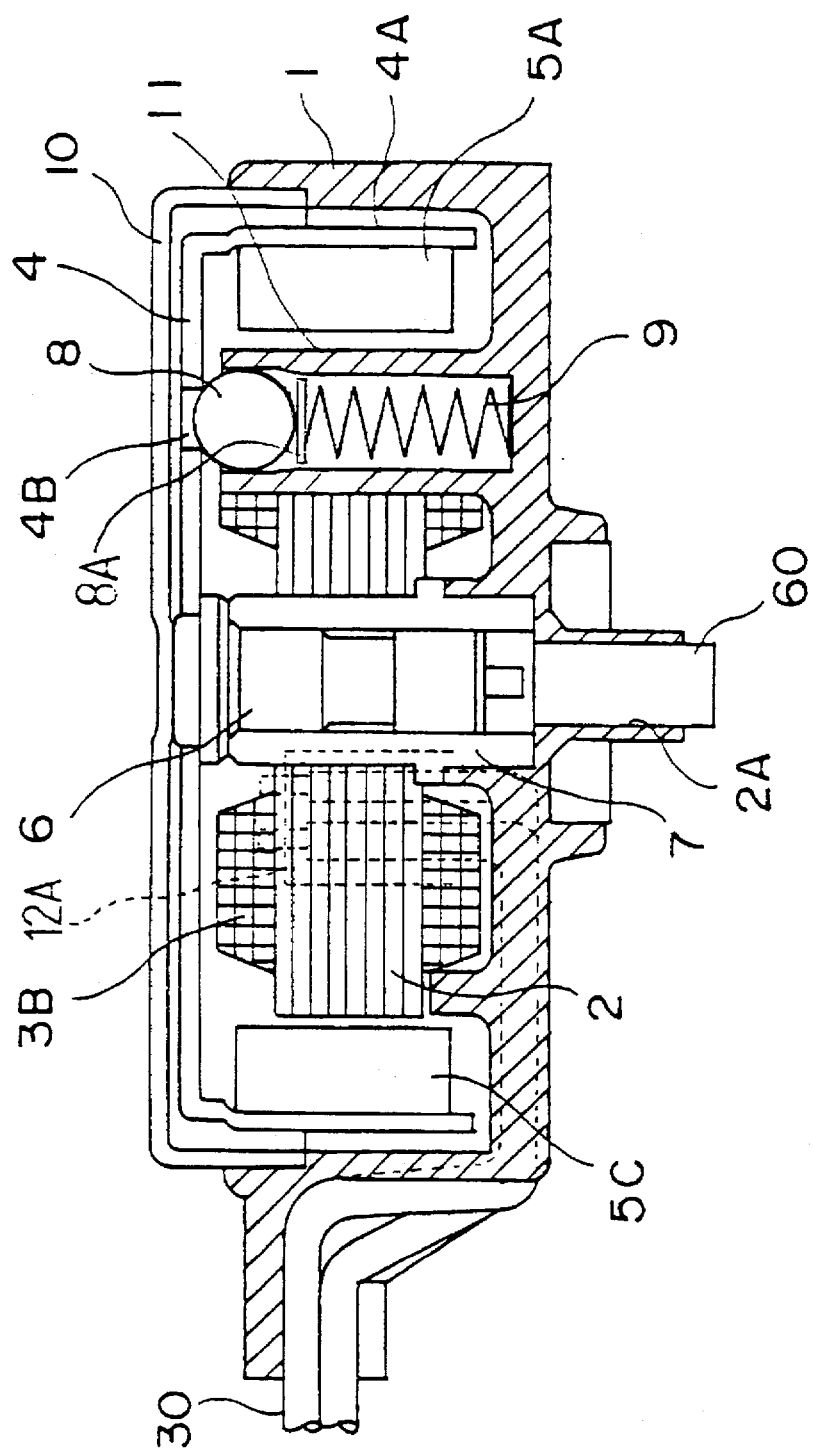
FIG. 2 is a perpendicular sectional view of the electromagnetic actuator taken along the line 2—2 of FIG. 1.
Figure 3:
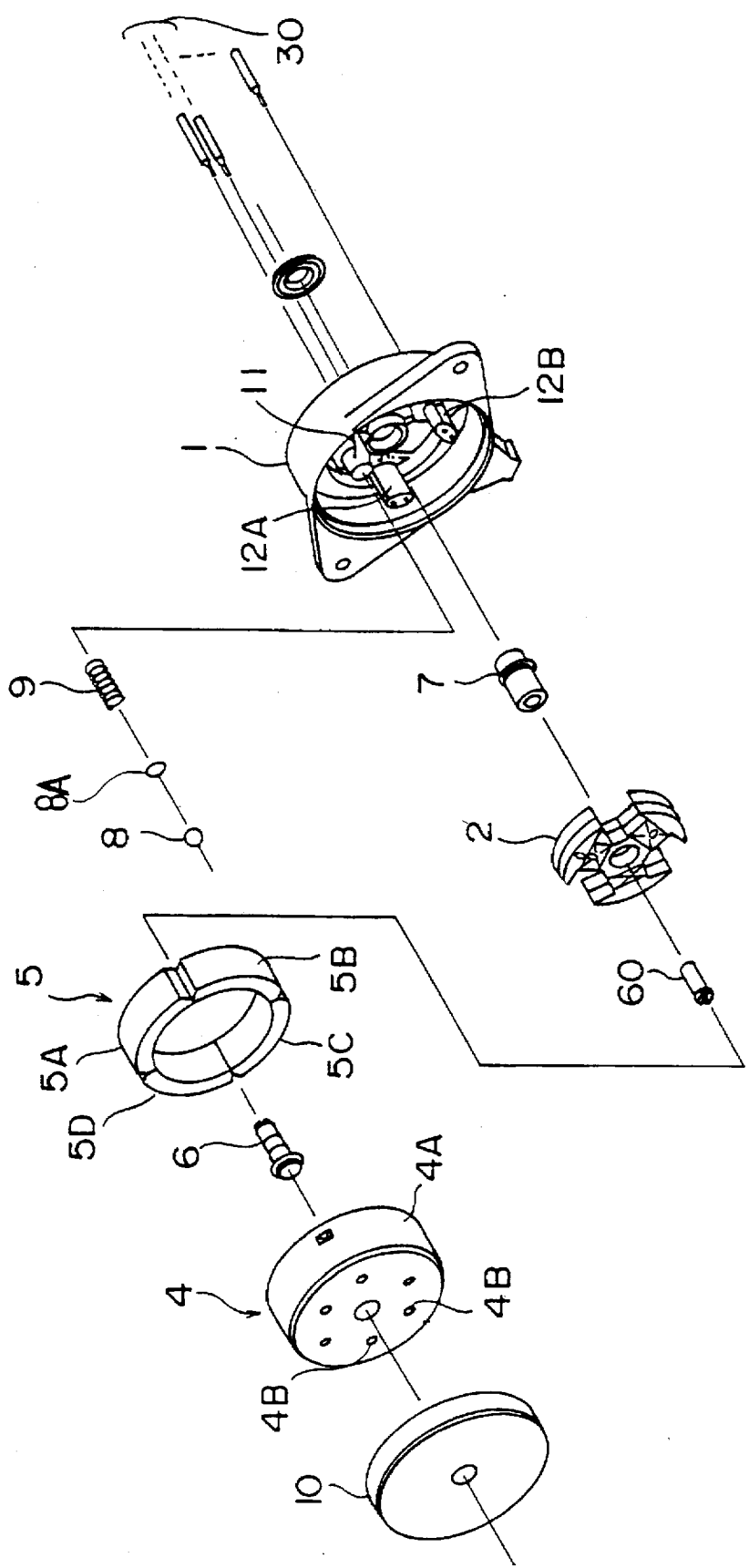
FIG. 3 is a perspective view of the electromagnetic actuator showing its separate components.

As shown in FIGS. 2 and 3, a throughole 2A is formed in the center of the housing 1, and a cylindrical bearing 7 is provided coaxially with the throughole 2A inside the housing 1. A rotor shaft 6 fixed to the base of the ring rotor 4 is supported by the bearing 7, and thereby supports the ring rotor 4 so that the rotor is free to turn relative to the housing 1. The ring rotor 4 is covered by a cover 10 fixed to the housing 1.

The rotor shaft 6 rotates together with a control rod of the hydraulic damper, not shown, via a joint 60 linked on the inner side of the bearing 7. Several orifices of different flow path are provided in parallel in a flowpath of the damper of which only one is applied at a time to pass the oil according to the rotation angle of the ring rotor 4.

Four magnets 5A–5D having arc-shaped cross-sections are fixed to the inner circumference of a cylindrical part 4A of the ring rotor 4. The magnets 5A, 5C have their inner circumferential surfaces magnetized as N poles, while the magnets 5B, 5D have their inner circumferential surfaces magnetized as S poles. The magnets are aligned with their N and S poles adjacent to each other.

A core 2 having three poles projecting radially at 120 degree intervals on the bearing 7 is situated inside the magnets 5A–5D, coils 3A–3C being wound around the core 2. The core 2, around which the coils 3A–3C are wound, functions as a stator fixed to the housing 1. The number of coils of the core 2 is set equal to three, i.e. one less than the number of poles of the magnets 5A–5D, and the number of coils of the core 2 is set equal to the number of change-over positions of the orifices of the hydraulic damper. If the number of coils of the core 2 is three, as according to this embodiment, the damping force of the hydraulic damper may be set to three levels, i.e. hard H, medium M or soft S.

Column-shaped guides 12A, 12B through which the ends of feed wires energizing these coils pass, project toward the base of the ring rotor 4 from the base of the housing 1 between the coils 3A, 3B and between the coils 3B, 3C.

As shown in FIGS. 5(A), and 5(B) the end of a feed wire 31 energizing the coil 3A and the end of a feed wire 33 energizing the coil 3C, pass through the guide 12A, while the end of a feed wire 32 energizing the coil 3B and an earth wire 34 of the coils 3A–3C, pass through the guide 12B. These feed wires 31–33 and earth wire 34 are bundled together, led off from the side of the housing 1 as a harness 30, and connected to a drive circuit described hereinafter.

A detente mechanism comprising a ball 8, retainer 8A and spring 9 is provided between the coils 3A, 3C as a means of retaining the ring rotor 4 in a predetermined stop position as shown in FIGS. 2 and 3. The spring 9 is housed in a cylindrical holder 11 that projects in the housing 1 toward the ring rotor 4.

Engaging holes 4B that engage with the ball 8 which is a positioning member, are formed on the circumference of the base of the ring rotor 4 opposite the holder 11. The engaging holes 4B are formed at intervals of for example 60 degrees corresponding to the stop positions of the ring rotor 4, i.e. the orifice selecting positions of the hydraulic damper. The ball 8, which is pushed by the spring 9 housed in the holder 11, rolls on the retainer 8A according to the rotation of the ring rotor 4, and engages with the rotation engaging holes 4B of the ring rotor 4 at predetermined positions so that further rotation of the ring rotor 4 is limited by the pushing force of the spring 9.

Figure 4:
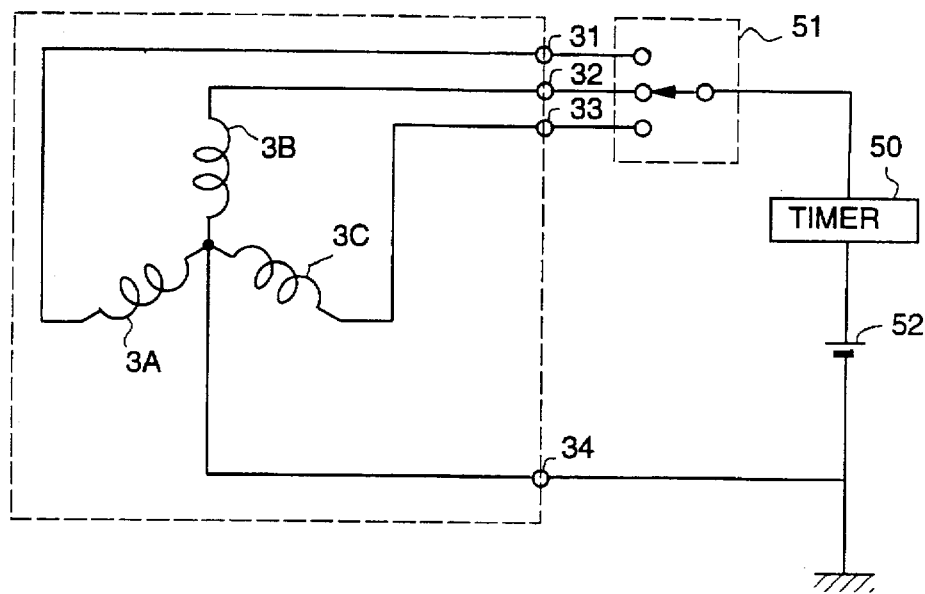
FIG. 4 is a control circuit diagram of the electromagnetic actuator.

The drive circuit of the ring rotor 4 is shown in FIG. 4. Power supplied to the coils 3A–3C is selected one coil at a time by a selector switch 51 whereby current from a power supply 52 is supplied to one of the coils 3A–3C as selected by the selector switch 51. Power is supplied for a predetermined time by a timer 50 interposed between the selector switch 51 and power supply 52, the power being shut off automatically after the predetermined time has elapsed. This is in order to prevent burning of the coils 3A–3C.

When the selector switch 51 energizes one of the coils 3A–3C without reversing the polarity of the current, the corresponding part of the outer circumference of the core 2 becomes an S pole. The change-over of the selector switch 51 is performed according to commands from a controller of an electronic control suspension system, not shown.

As described hereintofore, the ring rotor 4 is linked to the control rod of the hydraulic damper. The damping force of the hydraulic damper is switched through three levels, hard H, medium M and soft S, by rotational displacements of the ring rotor through 60 degree intervals.

As shown in FIG. 5A, when the position of the magnet 5C relative to the coil 3B is the M position, the ball 8 housed in the holder 11 engages with the engaging hole 4B so as to resist the rotation of the ring rotor 4. The control rod, not shown, is thereby held in position against external forces such as vibrations.

In order to change over from the medium M position to the soft S position, the selector switch 51 connects the feed wire 31 to the power supply 52 so as to energize the coil 3A as shown in FIG. 4.

As the core 2 comprises three poles compared to the four magnets 5A–5D, in the M position, the coils 3A and 3C are not opposite to the magnets 5A, 5B and 5D. When energizing occurs, the part of the outer circumference of the core 2 around which the coil 3A is wound becomes an S pole which repels the magnet 5B but attracts the magnet 5A. Due to this magnetic force, the ring rotor 4 rotates in a clockwise direction. As the ring rotor 4 rotates, the ball 8 which is pushed by the spring 9 mounts on the outer circumference of the engaging hole 4B, and rolls along the surface of the base of the ring rotor 4 which rotates.

As shown in FIG. 5B, when the magnet 5A of the cylindrical part 4A rotates through 60 degrees, the magnet 5A having its inner circumference magnetized as an N pole comes into a position facing the coil 3A. The displacement therefore stops due to mutual attraction of poles and one of the engaging holes 4B of the ring rotor 4 engages with the ball 8. Due to this rotation into the S position, the damping force generated by the hydraulic damper is changed over to "soft".

Energizing of the coil 3A is limited by the timer 50, and the current is shut off automatically after a predetermined time has elapsed, however even after the current is shut off, the ring rotor 4 is held in its stop position by the ball 8 pushed by the spring 9 and the engaging hole 4B. The power consumption of the electromagnetic actuator is therefore suppressed to a minimum.

To rotate the ring rotor from the S position to the H position via the M position, the feed wires 32, 33 are connected to the power supply 52 in sequence by the selector switch 51 to energize the coils 3B and 3C in sequence.

Due to this energizing, the part of the outer circumference of the core 2 around which the coil 3B is wound becomes an S pole that repels the magnet 5B but attracts the magnet 5C, so the ring rotor 4 rotates counterclockwise to the M position.

The part of the outer circumference of the core 2 around which the coil 3C is wound thereafter becomes an S pole that repels the magnet 5D but attracts the magnet 5A, so the ring rotor 4 rotates further counterclockwise into the H position.

After the ring rotor 4 has rotated to the H position, the timer 50 shuts off the current. However, in this position the ball 8 engages with the engaging hole 4B to resist rotation of the ring rotor 4. The ring rotor 4 is therefore held in this position until current is again supplied.

Depending on the setting of the orifice of the hydraulic damper, the actuator may also be changed over directly from the S position to the H position.

The energizing direction of the coils 3A–3C is always the same, hence the earth 34 is always used for grounding the coils 3A–3C. The internal wiring of the electromagnetic actuator and the construction of the switch 51 are therefore simple, moreover the rotation radius of the ring rotor 4, which rotates outside the stator, is large so a large rotation torque is generated.

Figure 8:
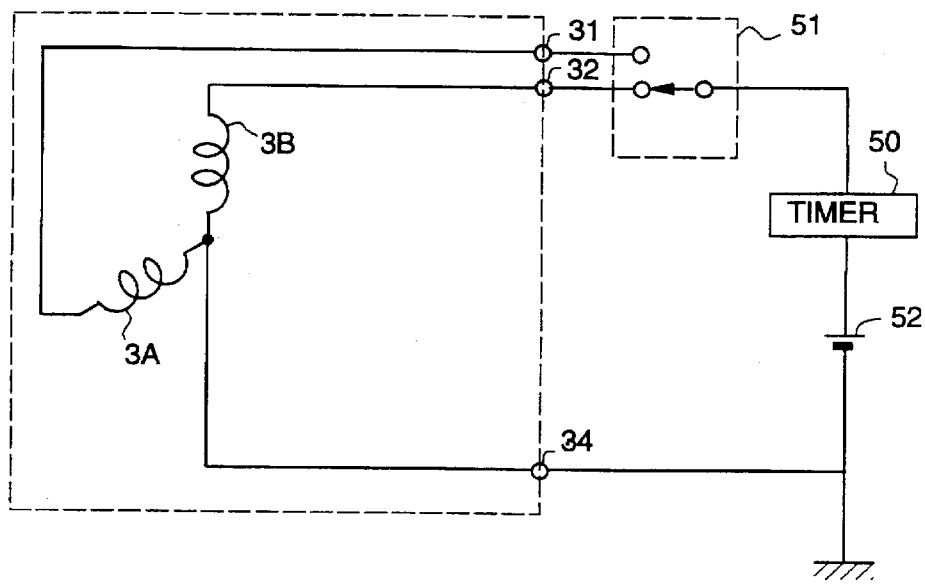
FIG. 8 is a control circuit diagram of the electromagnetic actuator according to the second embodiment.
Figure 6:
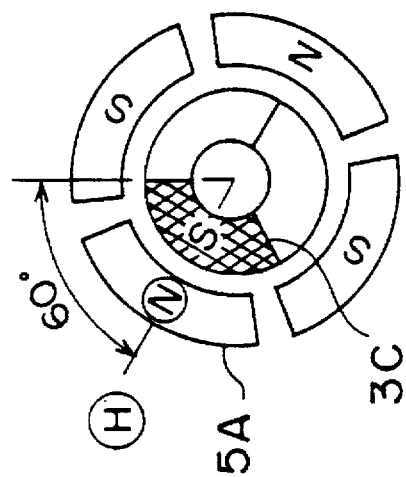
FIG. 6 is a schematic diagram showing three set positions of the ring rotor.
Figure 6:
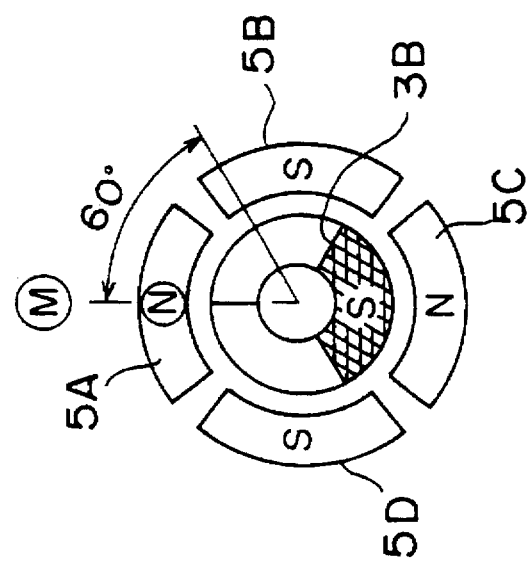
Figure 6:
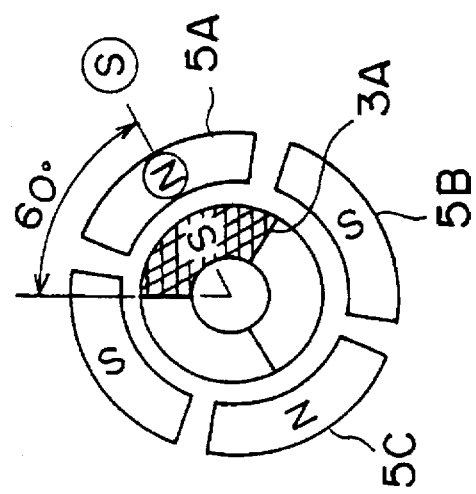
Figure 7:
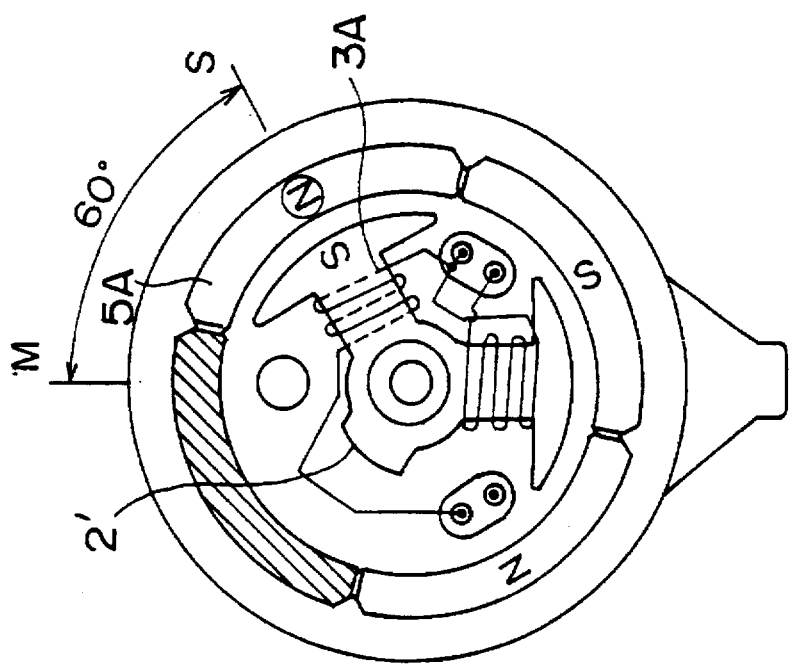
FIG. 7 is similar to FIG. 5 but showing a second embodiment of this invention.
Figure 7:
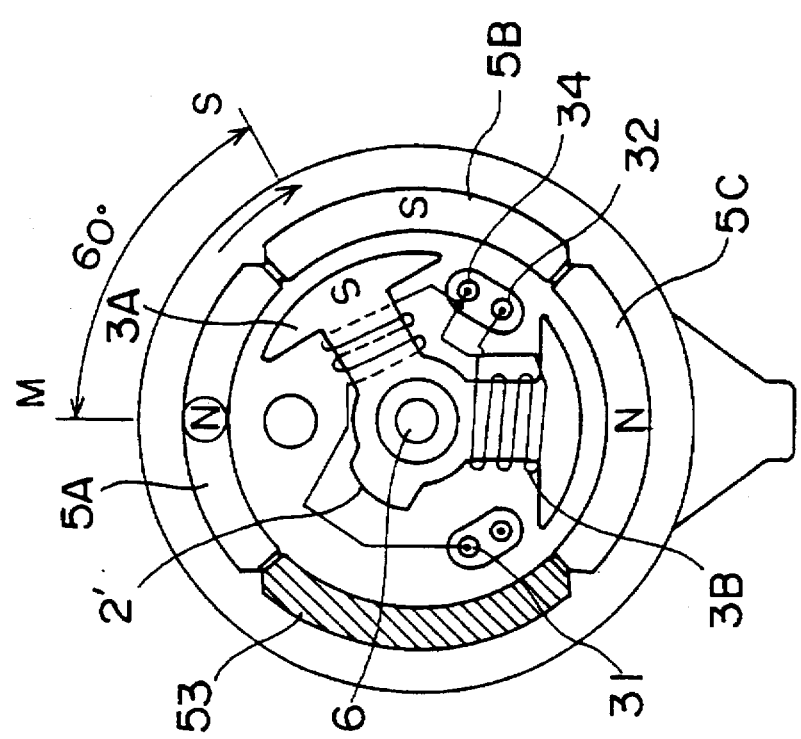

FIGS. 7 and 8 show a second embodiment of this invention.

According to this embodiment, a core 2' having two coils and lacking the coil 3C is used instead of the core 2 of the first embodiment. The magnet 5D is also eliminated, and a dummy magnet 53 is arranged in its place to maintain the balance of the ring rotor 4 and maintain the interval between the magnets 5A, 5C.

By selectively energizing the coil 3A or 3B, the ring rotor 4 is rotated through 60 degrees and switched between the M position and S position as shown in FIG. 7A and 7B. The drive circuit of the coils 3A, 3B is therefore simple, only the feed wires 31, 32 being changed over as shown in FIG. 8.

The intervals between the coils and the magnets can be adjusted by design modifications according to the rotational displacement angle required by the control rod.

The number of coils must be set to be one less than the number of magnets. However, there is no limitation on the actual numbers, and for example, five coils may be combined with six magnets. If the number of magnets is odd, dunes may be inserted between similar poles as described hereintofore.

The embodiments of this invention in which an exclusive property or privilege is claimed are defined as follows:

1. An electromagnetic rotary actuator that performs a rotation when energized, comprising:

a base a ring rotor rotatably supported on said base;

said ring rotor having a plurality of magnets arranged on an inner circumference of said ring rotor with their N and S poles oriented alternately;

a stator fixed to said base and disposed within said ring rotor;

a plurality of coils wound on said stator;

switch means, provided in an energizing path of said coils, for selectively energizing said coils to rotate said ring rotor to at least two predetermined positions relative to said base; and a detent mechanism for retaining said ring rotor at at least one of said two predetermined positions relative to said base in an absence of energy being supplied to said coils, said detent mechanism having an engaging hole formed at a predetermined location on said ring rotor, a detent member mounted on said base for engaging and disengaging with said engaging hole, and bias means for biasing said detent member towards said engaging hole to effect engagement therewith.

2. An electromagnetic rotary actuator as defined in claim 1, wherein said coils are one less in number than said magnets.

3. An electromagnetic rotary actuator as defined in claim 2, wherein said switch means comprises means for selectively supplying energizing current to one of said coils.

4. An electromagnetic rotary actuator as defined in claim 1, further comprising a timer installed in series with said switch means for interrupting a current supply to said energizing path when said supply has continued for a given time.

* * * * *

UNITED STATES PATENT AND TRADEMARK OFFICE
CERTIFICATE OF CORRECTION

PATENT NO. : 5,684,349
DATED : November 4, 1997
INVENTOR(S) : Yasuhiko Hara, et. al.

It is certified that error appears in the above-identified patent and that said Letters Patent is hereby corrected as shown below:

Title page, item [30], under "Foreign Application Priority Data, change the serial number of the Japanese Priority application from "6-157588" to --6-157558--.

Signed and Sealed this

Tenth Day of March, 1998

Attest:

BRUCE LEHMAN

*Attesting Officer*      *Commissioner of Patents and Trademarks*